(12) United States Patent
Omasa et al.

(10) Patent No.: US 8,753,729 B2
(45) Date of Patent: Jun. 17, 2014

(54) ADHESIVE RESIN COMPOSITION AND MULTILAYER STRUCTURE USING THE SAME

(75) Inventors: Shinya Omasa, Shanghai (CN); Takashi Sakuma, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 14/007,243

(22) PCT Filed: Mar. 21, 2012

(86) PCT No.: PCT/JP2012/057091
§ 371 (c)(1),
(2), (4) Date: Sep. 24, 2013

(87) PCT Pub. No.: WO2012/133008
PCT Pub. Date: Oct. 4, 2012

(65) Prior Publication Data
US 2014/0017428 A1 Jan. 16, 2014

(30) Foreign Application Priority Data
Mar. 25, 2011 (JP) .................. 2011-067454

(51) Int. Cl.
*B29D 22/00* (2006.01)
*B29D 23/00* (2006.01)
*B32B 1/08* (2006.01)

(52) U.S. Cl.
USPC ........................... 428/35.7; 428/515; 428/523

(58) Field of Classification Search
USPC ........................ 428/35.7, 515, 523
See application file for complete search history.

(56) References Cited

U.S. PATENT DOCUMENTS

| 7,354,655 | B2 | 4/2008 | Yamaguchi et al. |
| 8,485,385 | B2 | 7/2013 | Takahashi et al. |
| 2003/0175538 | A1 * | 9/2003 | Yamaguchi et al. .......... 428/515 |
| 2010/0221554 | A1 | 9/2010 | Tsubouchi et al. |

FOREIGN PATENT DOCUMENTS

| EP | 0 834 415 B1 | 3/2006 |
| JP | A-59-068351 | 4/1984 |
| JP | A-2010-156978 | 6/1998 |
| JP | A-2003-073506 | 3/2003 |
| JP | A-2007-008968 | 1/2007 |
| JP | A-2008-045122 | 2/2008 |
| JP | A-2010-105295 | 5/2010 |

* cited by examiner

*Primary Examiner* — Michael C Miggins
(74) *Attorney, Agent, or Firm* — Foley & Lardner LLP

(57) ABSTRACT

There is provided an adhesive resin composition suitable for a multilayer structure which retains sufficient adhesive strength even when in contact with gasoline or light gas oil, and has excellent long-term durability and durability in high-temperature fuels and excellent adhesive strength at high temperature. The adhesive resin composition of the invention includes a modified ethylene polymer (A1) which is graft-modified with an unsaturated carboxylic acid or a derivative thereof and which has a density of 930 to 980 kg/m$^3$, and an unmodified ethylene polymer (A2) having a density of 910 to 929 kg/m$^3$, wherein the adhesive resin composition has a melt flow rate (MFR) [ASTM D 1238 (temperature: 190° C., 2160 g load)] of 0.1 to 3 g/10 min and a density of 920 to 930 kg/m$^3$ and has an elution amount of 60 wt % or less at 85° C. or lower as determined by cross-fractionation chromatography. The present invention also relates to a multilayer structure formed by using the adhesion resin composition.

15 Claims, No Drawings

ADHESIVE RESIN COMPOSITION AND MULTILAYER STRUCTURE USING THE SAME

TECHNICAL FIELD

The present invention relates to an adhesive resin composition comprising a modified ethylene polymer composition which has less elution amount at high temperature and in which the molecular weight of polymers eluted at high temperature is high. In more detail, the present invention relates to an adhesive resin composition which retains sufficient interlayer adhesive strength even when in contact with gasoline or light gas oil, and has excellent interlayer adhesion under high temperature, excellent impact resistance, and excellent long-term durability and durability in high-temperature fuels. The present invention also relates to a multilayer structure suitable for an automotive fuel tank which has excellent long-term durability in high-temperature gasoline or light gas oil and excellent low-temperature drop impact strength.

BACKGROUND ART

As a multilayer structure suitable as an automotive fuel tank, there has been proposed a multilayer structure formed from a polyethylene resin layer/an adhesive layer/an ethylene•vinyl acetate copolymer saponification product layer (hereinafter also abbreviated as the "EVOH") or formed from a polyethylene resin/a mixture layer of an adhesive and an ethylene•vinyl acetate copolymer saponification product (for example, Patent Document 1).

As the adhesive layer of this multilayer structure, a composition containing an ethylene polymer partly or wholly graft-modified with an acid anhydride is used. However, if a modified ethylene polymer with low density is used, the resultant adhesive layer, when immersed in a fuel oil, may be swollen, and may have reduced adhesive strength at high temperature. On the other hand, if a modified ethylene polymer with high density is used, the resultant multilayer structure may have reduced low-temperature drop impact strength.

The demand for higher performance of automotive fuel tanks has been increasing. For example, as a result of diesel automobiles adopting a common rail system, in addition to the performance required so far, the automotive fuel tanks are required to have long-term durability when in contact with high-temperature fuels. Specifically, for example, the multilayer structure is required to be free from problems such as delamination between respective layers and delamination at the pinch-off part, even when in contact with high-temperature fuel.

CITATION LIST

Patent Document

Patent Document 1: JP-A-10-156978

SUMMARY OF THE INVENTION

Technical Problem

It is an object of the present invention to provide an adhesive resin composition, suitable for a multilayer structure, which retains sufficient adhesive strength even when in contact with gasoline or light gas oil, and has excellent long-term durability and durability in high-temperature fuels and excellent adhesive strength at high temperature.

It is another object of the present invention to provide a multilayer structure, suitable for an automotive fuel tank, which retains sufficient adhesive strength even when in contact with gasoline or light gas oil, and has excellent long-term durability and excellent adhesive strength at high temperature.

Technical Solution

The present inventors have their earnest studies and have found that an adhesive resin composition having specific properties, and a multilayer structure obtained from the adhesive resin composition achieve excellent effects to solve the problems, thereby completing the present invention.

That is, an embodiment of the present invention is:

[1] An adhesive resin composition comprising 2 to 40 wt % of a modified ethylene polymer (A1) which is graft-modified with an unsaturated carboxylic acid or a derivative thereof and which has a density of 930 to 980 kg/m$^3$, and 60 to 98 wt % of an unmodified ethylene polymer (A2) having a density of 910 to 929 kg/m$^3$ where (A1)+(A2)=100 wt %, wherein the adhesive resin composition has a melt flow rate (MFR) [ASTM D 1238 (temperature: 190° C., 2160 g load)] of 0.1 to 3 g/10 min and a density of 920 to 930 kg/m$^3$, and has an elution amount of 60 wt % or less at 85° C. or lower as determined by cross-fractionation chromatography. Preferable embodiments are described below.

[2] The adhesive resin composition, which further comprises 0 to 30 wt % of an unmodified ethylene polymer (A3) having a density of 930 to 980 kg/m$^3$ where (A1)+(A2)+(A3) =100 wt %.

[3] The adhesive resin composition, wherein the graft amount of the unsaturated carboxylic acid or a derivative thereof is 0.1 to 5 wt %.

[4] The adhesive resin composition, which has an Izod impact strength as measured in accordance with ASTM D 256 under −40° C. atmosphere of 10 kJ/m$^2$ or more.

[5] A multilayer structure comprising an adhesive layer (A) formed from the above adhesive resin composition, a polyethylene resin layer (B), and a polymer layer (C) selected from the group consisting of an ethylene•vinyl acetate copolymer saponification product and a polyamide.

[6] The multilayer structure, wherein the ethylene•vinyl acetate copolymer saponification product is a polymer having a saponification degree of 90 to 100% which is obtained by saponifying an ethylene•vinyl acetate copolymer having an ethylene content percentage of 15 to 70 mol %.

[7] The multilayer structure, wherein the polyamide is at least any of nylon 6, nylon 66, nylon 610, nylon 12, nylon 11, MXD nylon, an amorphous nylon and a copolymerized nylon.

[8] The multilayer structure, which comprises a rigrind layer (D) between the layer (B) and the layer (A).

[9] An automotive fuel tank comprising the above multilayer structure.

Advantageous Effects of the Invention

The adhesive resin composition of the present invention when used as an adhesive layer of a multilayer structure provides a multilayer structure which has high initial adhesive strength and retains high adhesive strength after in contact with gasoline or light gas oil, and has excellent adhesive strength at high temperature and excellent long-term durability and durability in high-temperature fuels.

Furthermore, by using the adhesive resin composition of the present invention, there is provided a multilayer structure suitable for an automotive fuel tank which retains sufficient adhesive strength even when in contact with high-temperature gasoline or light gas oil, and has excellent long-term durability and excellent low-temperature drop impact strength.

DESCRIPTION OF EMBODIMENTS

<Modified Ethylene Polymer (A1)>

The modified ethylene polymer (A1), which is one component of the adhesive resin composition of the present invention, is a polymer which is graft-modified with an unsaturated carboxylic acid or a derivative thereof and has a density of 930 to 980 kg/m$^3$, preferably 940 to 970 kg/m$^3$. The use of the modified ethylene polymer (A1) having a density within such range easily provides a composition excellent in heat-resistant adhesion. If a modified ethylene polymer having a density of less than 930 kg/m$^3$ is used and blended with an unmodified ethylene polymer, the resultant adhesive resin composition may have an elution amount of more than 60 wt % at 85° C. or lower as determined by cross-fractionation chromatography.

The modified ethylene polymer (A1) according to the present invention usually has a melt flow rate (MFR) [ASTM D 1238 (190° C., 2160 g load)] of 0.01 to 3.0 g/10 min, more preferably 0.05 to 1.5 g/10 min. If a polymer having MFR of less than 0.01 g/10 min is used, extrusion molding of the resultant adhesive resin composition may be difficult, and the pressure increase may exceed the pressure limit of a molding machine. On the other hand, if a polymer having MFR of more than 3 g/10 min is used, the adhesive resin composition tends to provide an product having a poor uniformity in its thickness, and having a reduced molecular weight, which may reduce the drop impact strength of a multilayer structure.

The graft amount of the unsaturated carboxylic acid or a derivative thereof is usually 0.01 to 10 wt %, preferably 0.02 to 5 wt %. If the graft amount is too small, the adhesivity may be insufficient. If the graft amount is too large, crosslinking readily occurs and it is difficult to keep the quality of the resultant modified ethylene polymer.

Examples of the unsaturated carboxylic acid or a derivative thereof according to the present invention include unsaturated carboxylic acids such as acrylic acid, maleic acid, fumaric acid, tetrahydrophthalic acid, itaconic acid, citraconic acid, crotonic acid, isocrotonic acid, and Nadic acid (endocis-bicyclo [2.2.1]hepto-5-ene-dicarboxylic acid); and derivatives thereof such as acid halides, amides, imides, anhydrides and esters. Specific examples of the derivatives include maleyl chloride, maleimide, maleic anhydride, citraconic anhydride, monomethyl maleate, dimethyl maleate and glycidyl maleate. Of these, unsaturated dicarboxylic acids or acid anhydrides thereof are preferred. Particularly, maleic acid, Nadic acid, or acid anhydrides thereof are preferably used.

The modified ethylene polymer (A1) according to the present invention may be produced by various known methods. For example, in one method, an ethylene polymer is dissolved in an organic solvent to prepare a solution, and to the solution an unsaturated carboxylic acid or a derivative thereof, and optionally a radical initiator such as an organoperoxide are added. Then, the mixture is allowed to undergo reaction usually at a temperature of 60 to 350° C., preferably 80 to 190° C., for 0.5 to 15 hours, preferably 1 to 10 hours. In another method, with an extruder or the like, in the absence of solvents, an ethylene polymer, an unsaturated carboxylic acid or a derivative thereof and optionally a radical initiator such as an organoperoxide are added, and the mixture is allowed to undergo reaction usually at a temperature of higher than the melting point of the ethylene polymer, preferably 120 to 350° C., for 0.5 to 10 minutes.

An unmodified ethylene polymer serving as a raw material of the modified ethylene polymer (A1) according to the present invention is an ethylene homopolymer or a copolymer of ethylene and an α-olefin. The α-olefin to be copolymerized with ethylene is an α-olefin having 3 or more carbon atoms, preferably 3 to 10 carbon atoms, with specific examples including propylene, 1-butene, 1-pentene, 1-hexene, 1-octene, 1-decene, 4-methyl-1-pentene and combination of two or more of these. The copolymerization amount of the α-olefin, which is not particularly limited as long as the resultant density falls within the range described below, is usually not more than 10 mol %.

The unmodified ethylene polymer according to the present invention is not particularly limited as long as the resultant modified ethylene polymer (A1) has a density within the above range, but the unmodified ethylene polymer according to the present invention usually has a density of 930 to 980 kg/m$^3$ and MFR of 0.1 to 50 g/10 min.

This ethylene polymer may be produced by known methods such as high-pressure method or low-pressure method using e.g., a Ziegler-type Ti-based catalyst or Co-based catalyst, or a metallocene-based catalyst.

<Unmodified Ethylene Polymer (A2)>

The unmodified ethylene polymer (A2), which is another component of the adhesive resin composition of the present invention, has a density of 910 to 940 kg/m$^3$, preferably 915 to 935 kg/m$^3$. If an unmodified ethylene polymer having a density of less than 910 kg/m$^3$ is used and is blended with the modified ethylene polymer, the resultant adhesive resin composition may have an elution amount of more than 60 wt % at 85° C. or lower as determined by cross-fractionation chromatography.

The unmodified ethylene polymer (A2) usually has MFR [ASTM D 1238 (190° C., 2160 g load)] of 0.01 to 10 g/10 min, preferably 0.10 to 5 g/10 min. If a polymer having MFR of less than 0.01 g/10 min is used, extrusion molding of the resultant adhesive resin composition may be difficult, and the pressure becomes increased, which may exceed the pressure limit of a molding machine. On the other hand, if a polymer having MFR of more than 10 g/10 min is used, the resultant adhesive resin composition tends to provide an product having a poor uniformity in its thickness, and having a reduced molecular weight, which may reduce the drop impact strength in the case of a multilayer structure.

<Adhesive Resin Composition>

The adhesive resin composition of the present invention comprises the modified ethylene polymer (A1) in an amount of 2 to 40 wt %, preferably 10 to 35 wt %, and the unmodified ethylene polymer (A2) in an amount of 60 to 98 wt %, preferably 65 to 90 wt % where (A1)+(A2)=100 wt %, wherein the adhesive resin composition has a melt flow rate (MFR) [ASTM D 1238 (190° C., 2160 g load)] of 0.1 to 3 g/10 min, preferably 0.5 to 2.0 g/10 min and a density of 920 to 930 kg/m$^3$, preferably 925 to 929 kg/m$^3$, and has an elution amount of 60 wt % or less, preferably 55 wt % or less, at 85° C. or lower as determined by cross-fractionation chromatography (hereinafter also abbreviated as "CFC"), and preferably an elution amount of 10 wt % or more, more preferably wt % or more, at 85° C. or lower as determined by cross-fractionation chromatography (CFC), and wherein the weight average molecular weight (Mw) of eluted components at a temperature of higher than 85° C. is preferably not less than 100,000, more preferably not less than 120,000.

In the adhesive resin composition of the present invention, preferably, the content of the graft-modified unsaturated carboxylic acid or a derivative thereof is 0.001 to 10 wt %, more preferably 0.002 to 1 wt %. If the content of the graft-modified unsaturated carboxylic acid or a derivative thereof is too small, the adhesive power may be insufficient. If the content of the graft-modified unsaturated carboxylic acid or a derivative thereof is too large, crosslinking reaction readily occurs, and it is difficult to stabilize the quality of the adhesive resin composition.

The adhesive resin composition, by having MFR falling within the above range, has good moldability. In an adhesive resin composition having MFR of more than 3.0 g/10 min, Mw of eluted components at a temperature of higher than 85° C. as determined by CFC may be less than 100,000.

If an adhesive resin composition having a density of less than 920 kg/m$^3$ is used for, e.g., a gasoline tank, the gasoline tank may be swollen by gasoline and may have reduced mechanical strength, and tends to have reduced interlayer adhesive power at a high temperature of 80° C. or higher. On the other hand, if an adhesive resin composition having a density of more than 930 kg/m$^3$ is used, for example together with an ethylene-vinyl acetate copolymer saponification product to form a multilayer structure, the multilayer structure easily has unstable interlayer adhesive power, and tends to have reduced low-temperature drop impact strength. An adhesive resin composition with a density of less than 920 kg/m$^3$ may have an elution amount of more than 60 wt % at 85° C. or lower as determined by cross-fractionation chromatography.

If an adhesive resin composition having an elution amount of more than 60 wt % at 85° C. or lower as determined by CFC is used for a multilayer structure, the multilayer structure has larger swelling with respect to fuel oils such as gasoline, easily loses mechanical strength, and easily has poor adhesive strength at high temperature.

If an adhesive resin composition wherein Mw of eluted components at a temperature of higher than 85° C. as determined by CFC is less than 100,000 is used to form a multilayer structure, the adhesive resin composition tends to have poor adhesive strength at high temperature with e.g., the ethylene vinyl acetate copolymer saponification product.

The elution amount at 85° C. or lower as determined by CFC can be arbitrarily adjusted by a skilled person. For example, an adhesive resin composition obtained by using a modified ethylene polymer with a high density but with a wide composition distribution may have an elution amount of more than 60 wt % at 85° C. or lower as determined by CFC.

The adhesive resin composition of the present invention preferably has an Izod impact strength as measured in accordance with ASTM D 256 under −40° C. atmosphere of 10 kJ/m$^2$ or more, preferably 12 kJ/m$^2$ or more. If an adhesive resin composition having a low Izod impact strength under −40° C. atmosphere is used to form a multilayer structure, the multilayer structure tends to have reduced low-temperature drop impact strength.

The adhesive resin composition of the present invention may be produced by various known methods. For example, in one method, the modified ethylene polymer (A1) is dry-blended with the unmodified ethylene polymer (A2) each in the above range with a Henschel mixer, a tumbler blender, a V-blender or the like. In another method, after dry blending, the mixture is melt kneaded with a monoaxial extruder, a multiaxial extruder, a Banbury mixer or the like. In still another method, the components are stirred and mixed in the presence of a solvent.

The adhesive resin composition of the present invention may comprise, together with the modified ethylene polymer (A1) and the unmodified ethylene polymer (A2), an unmodified ethylene polymer (A3) having a density of 930 to 980 kg/m$^3$. When the unmodified ethylene polymer (A3) is contained, the amount of the unmodified ethylene polymer (A3) is preferably not more than 30 wt % with respect to 100 wt % of the total amount of the modified ethylene polymer (A1), the unmodified ethylene polymer (A2) and unmodified ethylene polymer (A3). When the unmodified ethylene polymer (A3) is added, the preparation methods described above may be adopted.

The adhesive resin composition of the present invention may optionally contain common additives such as antioxidants, weathering stabilizers, antistatic agents, anti-fogging agents, antiblocking agents, lubricants, nucleating agent and pigments, other polymers and rubbers, as long as the object of the present invention is not impaired.

<Multilayer Structure>

The multilayer structure of the present invention comprises an adhesive layer (A) formed from the above adhesive resin composition; a polyethylene resin layer (B) formed on at least one side of the adhesive layer (A); and a barrier resin layer (C) formed on the other side of the adhesive layer (A).

In the multilayer structure of the present invention, between the polyethylene resin layer (B) and the adhesive layer (A), a rigrind layer (D) may be present. The rigrind layer (D) according to the present invention is prepared by grinding burrs (unnecessary portions) generated when molding the multilayer structures, collected multilayer structures (scraps), defective products and the like occurring in molding procedure, and then optionally by melt kneading the resultant grind product with an extruder or the like (rigrind). The rigrind layer (D) does not necessarily need to be composed of the above collected multilayer structures alone, and thus the rigrind layer (D) may be blended with, for example the polyethylene resin used for the layer (B), to thereby improve mechanical properties.

The components (A), (B), (C) and (D), which constitute the multilayer structure of the present invention, may contain known additives such as fillers, stabilizers, lubricants, antistatic agents, flame retardants, foaming agents, in a range that does not impair the object of the present invention.

<Polyethylene Resin>

The polyethylene resin that constitutes the polyethylene resin layer (B) of the multilayer structure of the present invention is an ethylene homopolymer, or a random copolymer of ethylene and an α-olefin. The copolymerization amount of the α-olefin, which is not particularly limited as long as the polyethylene resin has a density within the range described below, is preferably not more than 10 mol %, more preferably not more than 5 mol %. The α-olefin is preferably an α-olefin having 3 to 10 carbon atoms, with specific examples thereof including propylene, 1-butene, 1-hexene, 4-methyl-l-pentene, 1-octene and 1-decene.

The polyethylene resin according to the present invention preferably has a melt flow rate (MFR) [ASTM D 1238 (temperature: 190° C., load: 2160 g load)] of 0.01 to 3.0 g/10 min, more preferably 0.05 to 1.5 g/10 min; and preferably has density of 0.940 to 0.980 g/cm$^3$, more preferably 0.950 to 0.970 g/cm$^3$. If a polyethylene resin having MFR exceeding the above range is used for a large-size multilayer structure, the large-size multilayer structure may have insufficient impact strength. The polyethylene resin having such MFR may be poor in blow moldability, and a multilayer structure formed from a large-size blow product may be difficult to be molded. On the other hand, a polyethylene resin having MFR of less than the above range tends to be difficult to be extrusion-molded. A polyethylene resin having a density of less than the above range may provide a multilayer structure having poor fuel permeability.

<Barrier Resin>

The barrier resin that constitutes the gas barrier resin layer (C) of the multilayer structure of the present invention may be various known resins having barrier properties, examples of which are resins excellent in barrier properties including an ethylene•vinyl acetate copolymer saponification product, a polyamide resin, a polyvinylidene chloride-based resin and polyacrylonitrile. Among these, ethylene•vinyl acetate copolymer saponification product and polyamide resin are preferable.

<Ethylene•vinyl Acetate Copolymer Saponification Product>

The ethylene•vinyl acetate copolymer saponification product [also called ethylene•vinyl alcohol copolymer (EVOH)] according to the present invention is preferably a polymer which is obtained by saponifying an ethylene vinyl acetate copolymer having an ethylene content percentage of 15 to 70 mol %, and which has saponification degree of 90 to 100%. A saponification product having an ethylene content percentage of less than 15 mol %, in which its melting point is close to its decomposition temperature, may be difficult to finely disperse in the ethylene polymer. A saponification product having an ethylene content percentage that is too large may have reduced barrier properties, and may deviate from the object of the present invention.

<Polyamide>

Examples of the polyamide according to the present invention include nylon 6, nylon 66, nylon 610, nylon 12, nylon 11, MXD nylon, an amorphous nylon and a copolymerized nylon.

<Specific Examples of Multilayer Structure>

Examples of the layer structure of the multilayer structure of the present invention include:

three-layer structures such as:

polyethylene resin layer (B) [hereinafter abbreviated as "PE layer (B)"]/adhesive layer (A) formed from the adhesive resin composition [hereinafter abbreviated as "adhesive layer (A)"]/ethylene•vinyl acetate copolymer saponification product layer [hereinafter abbreviated as "EVOH layer"] (C-1); and PE layer (B)/adhesive layer (A)/polyamide resin layer [hereinafter abbreviated as "NY layer"] (C-2);

four-layer structures such as:

PE layer (B)/rigrind layer (D)/adhesive layer (A)/EVOH layer (C-1); PE layer (B)/rigrind layer (D)/adhesive layer (A)/layer (C) composed of a polyamide resin; PE layer (B)/adhesive layer (A)/EVOH layer (C-1)/adhesive layer (A); and PE layer (B)/adhesive layer (A)/NY layer (C-2)/adhesive layer (A);

five-layer structures such as:

PE layer (B)/rigrind layer (D)/adhesive layer (A)/EVOH layer (C-1)/adhesive layer (A); PE layer (B)/rigrind layer (D)/adhesive layer (A)/NY layer (C-2)/adhesive layer (A); PE layer (B)/adhesive layer (A)/EVOH layer (C-1)/adhesive layer (A)/PE layer (B); and PE layer (B)/adhesive layer (A)/NY layer (C-2)/adhesive layer (A)/PE layer (B);

six-layer structures such as:

PE layer (B)/rigrind layer (D)/adhesive layer (A)/EVOH layer (C-1)/adhesive layer (A)/PE layer (B); and PE layer (B)/rigrind layer (D)/adhesive layer (A)/NY layer (C-2)/adhesive layer (A)/PE layer (B); and seven-layer structures such as:

PE layer (B)/rigrind layer (D)/adhesive layer (A)/EVOH layer (C-1)/adhesive layer (A)/rigrind layer (D)/PE layer (B); and PE layer (B)/rigrind layer (D)/adhesive layer (A)/NY layer (C-2)/adhesive layer (A)/rigrind layer (D)/PE layer (B).

The multilayer structure of the present invention may be produced for example by known coextrusion blow molding method as follows. With a plurality of extruders capable of melting the polyethylene resin used for the layer (B), the adhesive resin composition used for the adhesive layer (A), the barrier resin used for the layer (C), and optionally the rigrind product used for the rigrind layer (D), respective polymers and the like are molten and laminated, and then are coextruded as a molten parison from a tip from the extruders, and the parison is set in a mold. Thereafter, into the parison, pressurized fluid is poured to mold a desired shape. The parison thus molded is cooled and solidified, and then collected.

The multilayer structure of the present invention has excellent fuel barrier properties, high impact strength resistance, and excellent interlayer adhesive power, durability and heat-resistant adhesion, and therefore is suitably used particularly as automotive fuel tanks.

EXAMPLES

The present invention is described in more detail with reference to Examples, but the present invention is in no way limited to these Examples, unless going beyond the summary of the invention.

In Examples and Comparative Examples, properties were measured in the methods described below.

(1) MFR (g/10 min)

MFR was measured in accordance with ASTM D 1238 at a temperature of 190° C. under a load of 2160 g.

(2) Density (kg/m$^3$)

Density was measured in accordance with ASTM D 1505.

(3) Elution Amount at 85° C. or Lower (g)

Elution amount at 85° C. or lower was measured by cross-fractionation chromatography (CFC).

(4) Weight Average Molecular Weight (Mw) of Eluted Components at a Temperature of Higher Than 85° C.

By cross-fractionation chromatography, eluted components at 85° C., at 90° C., at 95° C. and at 100° C. were collected, and the weight average molecular weights of the eluted components were measured by gel permeation chromatography (GPC) in accordance with an ordinary method.

(5) Izod Impact Strength (kJ/m$^2$)

Izod impact strength was measured in accordance with ASTM D 256, under −40° C. atmosphere.

(6) Initial Adhesive Strength (N/10 mm)

The initial adhesive strength of the multilayer structure was measured as follows. A sample of 10 mm in width was cut out from the side of the four-kind six-layer multilayer structure, and regarding this sample, the adhesive strength between the adhesive resin composition [layer (A)] provided on the inner layer side and the ethylene•vinyl acetate copolymer saponification product layer [layer (C-1) ] was measured both at room temperature (23° C.) and in a thermostat bath at 80° C. The peeling measurement test was performed by T-peeling method at a peeling rate of 50 mm/min. This measurement was performed five times, and an average value thereof was determined.

(7) Adhesive Strength After Immersion in Fuels (N/10 mm)

The adhesive strength after immersion in fuels was determined as follows. In the same manner as in the initial adhesive strength, a sample of 10 mm in width was cut out from the side of the four-kind six-layer multilayer structure. This sample was immersed in Fuel-C at 65° C., CE50 at 65° C. and light gas oil at 80° C., for 2000 hours. Thereafter, the adhesive strength between the adhesive resin composition [layer (A)] provided on the inner layer side and the ethylene vinyl acetate copolymer saponification product layer [layer (C-1)] was measured in a thermostat bath at room temperature (23° C.). The peeling measurement test was performed by T-peeling method at a peeling rate of 50 mm/min. This measurement was performed five times, and an average value thereof was determined.

(8) Low-Temperature Drop Impact Strength

The low-temperature drop impact strength was determined as follows. The four-kind six-layer multilayer structure had ethylene glycol enclosed therein, and cooled to −40° C., and dropped from a height of 6 m. At this time, whether the multilayer structure underwent cracking or not was evaluated. This measurement was performed two times. Whether there was cracking or not was visually observed. Evaluation results of the low-temperature drop impact strength are indicated in Table 2. Judgment by observation was conducted as follows.

AA: no cracking was observed two times.
BB: cracking was observed at least one time.

The modified ethylene polymers (A1) [hereinafter referred to as the "modified PE"] and the unmodified ethylene polymer (A2) [hereinafter referred to as the "PE"] used in the adhesive resin compositions of Examples and Comparative Examples are indicated in Table 1. In Table, MAH amount refers to the graft amount of maleic anhydride used as an unsaturated carboxylic acid or a derivative thereof.

TABLE 1

| | Unit | MFR g/10 min | Density Kg/m$^3$ | MAH amount wt % | Elution amount at 85° C. or lower as determined by CFC wt % |
|---|---|---|---|---|---|
| (A1) | Modified PE-1 | 0.3 | 950 | 1.0 | 0.30 |
| | Modified PE-2 | 5 | 965 | 2.4 | 26.67 |
| | Modified PE-3 | 0.3 | 920 | 1.0 | 50.56 |
| | Modified PE-4 | 0.5 | 940 | 0.5 | 5.00 |
| | Modified PE-5 | 0.3 | 950 | 0.5 | 3.00 |
| (A2) | PE-1(LLDPE) | 1.5 | 920 | — | 59.61 |
| | PE-2(HDPE) | 0.8 | 950 | — | 0.30 |

Example 1

30 wt % of the modified PE-1 and 70 wt % of PE-1 that are described in Table 1 were melt-kneaded with a monoaxial extruder at 230° C., to prepare an adhesive resin composition (adhesive resin-1). Then, the following components were used:

the adhesive resin-1 as a polymer for the layer (A);
a high-density polyethylene having a density of 950 kg/m$^3$ and MFR under a load of 2160 g at 190° C. of 6 g/10 min, as a polymer for the layer (B);
an ethylene•vinyl acetate copolymer saponification product (manufactured by KURARAY CO., LTD., trade name: EVAL F101B), as a polymer for the layer (C); and
a rigrind material prepared by grinding the multilayer structure composed of the layer (A), the layer (B) and the layer (C), as the layer (D).

These components were extruded in this order: layer (B)/layer (D)/layer (A)/layer (C)/layer (A)/layer (B), from a co-extrusion blowing die (die temperature was set at 230° C.) as a parison. The parison was held by a mold, and then into the parison, compressed air was blown. The resultant parison was cooled and collected. This method provided a four-kind six-layer multilayer structure having a thickness percentage proportion of 13/40/2/3/2/40, a total thickness of 6 mm and a volume of 40 L.

Properties of the resultant multilayer structure were measured by the methods described above. Results are set forth in Table 2.

Example 2

The procedure was performed in the same manner as Example 1, except that the adhesive resin-1 used in Example 1 was replaced with the adhesive resin composition described in Table 2 (adhesive resin-2), to obtain a four-kind six-layer multilayer structure.

Properties of the resultant multilayer structure were measured by the methods described above. Results are set forth in Table 2.

Example 3

The procedure was performed in the same manner as Example 1, except that the adhesive resin-1 used in Example 1 was replaced with the adhesive resin composition described in Table 2 (adhesive resin-3), to obtain a four-kind six-layer multilayer structure.

Properties of the resultant multilayer structure were measured by the methods described above. Results are set forth in Table 2.

Comparative Example 1

The procedure was performed in the same manner as Example 1, except that the adhesive resin-1 used in Example 1 was replaced with the adhesive resin composition described in Table 2 (adhesive resin-4), to obtain a four-kind six-layer multilayer structure.

Properties of the resultant multilayer structure were measured by the methods described above. Results are set forth in Table 2.

Comparative Example 2

The procedure was performed in the same manner as Example 1, except that the adhesive resin-1 used in Example 1 was replaced with the adhesive resin composition described in Table 2 (adhesive resin-5), to obtain a four-kind six-layer multilayer structure.

Properties of the resultant multilayer structure were measured by the methods described above. Results are set forth in Table 2.

Comparative Example 3

The procedure was performed in the same manner as Example 1 except that the adhesive resin-1 used in Example 1 was replaced with the adhesive resin composition described in Table 2 (adhesive resin-6), to obtain a four-kind six-layer multilayer structure.

Properties of the resultant multilayer structure were measured by the methods described above. Results are set forth in Table 2.

Comparative Example 4

The procedure was performed in the same manner as Example 1 except that the adhesive resin-1 used in Example 1 was replaced with the adhesive resin composition described in Table 2 (adhesive resin-7), to obtain a four-kind six-layer multilayer structure.

Properties of the resultant multilayer structure were measured by the methods described above. Results are set forth in Table 2.

TABLE 2

|  |  | Unit | Ex. 1 Adhesive resin-1 | Ex. 2 Adhesive resin-2 | Ex. 3 Adhesive resin-3 | Comp. Ex. 1 Adhesive resin-4 | Comp. Ex. 2 Adhesive resin-5 | Comp. Ex. 3 Adhesive resin-6 | Comp. Ex. 4 Adhesive resin-7 |
|---|---|---|---|---|---|---|---|---|---|
| (A1) | Modified PE-1 | wt % | 30 | 15 | 15 |  |  |  |  |
|  | Modified PE-2 |  |  |  |  | 5 |  |  |  |
|  | Modified PE-3 |  |  |  |  |  | 15 |  |  |
|  | Modified PE-4 |  |  |  |  |  |  | 100 |  |
|  | Modified PE-5 |  |  |  |  |  |  |  | 100 |
| (A2) | PE-1 (LLDPE) |  | 70 | 70 | 85 | 95 | 85 |  |  |
|  | PE-2 (HDPE) |  |  | 15 |  |  |  |  |  |
| Properties | Density | kg/m$^3$ | 928 | 928 | 922 | 923 | 922 | 940 | 950 |
|  | MFR | g/10 min | 0.9 | 1.1 | 0.9 | 1.0 | 1.0 | 0.5 | 0.3 |
|  | MAH content | wt % | 0.3 | 0.15 | 0.15 | 0.12 | 0.15 | 0.5 | 0.5 |
|  | Elution amount at 85° C. or lower | wt % | 53 | 51 | 59 | 67 | 72 | 5 | 3 |
|  | Mw of eluted components at 85° C. | — | 126500 | 121000 | 124300 | 121000 | 120600 | 90500 | 89520 |
|  | Mw of eluted components at 90° C. | — | 142000 | 145600 | 132500 | 129700 | 121200 | 94100 | 91200 |
|  | Mw of eluted components at 95° C. | — | 150200 | 158200 | 142300 | 150800 | 131100 | 102400 | 92230 |
|  | Mw of eluted components at 100° C. | — | 164200 | 162300 | 142200 | 71140 | 90160 | 154100 | 158600 |
|  | Izod at −40° C. | kJ/m$^2$ | 12 | 12 | 14 | 12 | 12 | 7 | 5 |
| Initial adhesive strength | 23° C. atmosphere | N/10 mm | 232 | 218 | 196 | 92 | 105 | 118 | 112 |
|  | 80° C. atmosphere |  | 215 | 203 | 178 | 96 | 52 | 109 | 147 |
| Adhesive strength after immersion in fuels | Fuel-C/65° C. | N/10 mm | 152 | 131 | 119 | 92 | 86 | 92 | 115 |
|  | Light gas oil/80° C. |  | 167 | 143 | 131 | 96 | 86 | 101 | 102 |
| Dropping test | −40° C. |  | AA | AA | AA | AA | AA | BB | BB |

[Evaluation Results]

As shown in Table 2, the multilayer structures obtained in Example 1 and Example 2 exhibit superior results in all the items of the evaluation. As compared with the multilayer structures obtained in Example 1 and Example 2 having less elution amount at 85° C. or lower as determined by CFC, the multilayer structure obtained in Example 3, which has an elution amount of 59 wt % at 85° C. or lower as determined by CFC, has a slightly lower adhesive strength, but the adhesive strength is sufficiently high to use.

On the other hand, the multilayer structures obtained in Comparative Example 1 and Comparative Example 2, though composed of the composition containing the modified ethylene polymer with high density and the unmodified ethylene polymer with low density, have an uncontrolled elution amount at 85° C. or lower, i.e., an elution amount of more than 60 wt % at 85° C. or lower as determined by CFC, resulting in having lower initial adhesive strength and lower adhesive strength after immersion in fuels. The multilayer structures obtained in Comparative Example 3 and Comparative Example 4 have a density of more than 930 kg/m$^3$ and an Izod impact strength under −40° C. atmosphere of not more than 10 kJ/m$^2$, resulting in having reduced low-temperature drop impact strength.

Industrial Applicability

The adhesive resin composition can meet the demand for higher performance which is required for automotive fuel tanks as a result of diesel automobiles adopting a common rail system, by e.g., maintaining long-term durability when in contact with high-temperature fuels, and preventing the delamination of respective layers and the delamination at the pinch-off part in the multilayer structure for long hours when in contact with high-temperature fuels, and therefore can greatly contribute to e.g., providing lightweight automobiles.

The invention claimed is:

1. An adhesive resin composition comprising 2 to 40 wt % of a modified ethylene polymer (A1) which is graft-modified with an unsaturated carboxylic acid or a derivative thereof and which has a density of 930 to 980 kg/m$^3$, and 60 to 98 wt % of an unmodified ethylene polymer (A2) having a density of 910 to 929 kg/m$^3$ where (A1)+(A2)=100 wt %, wherein the adhesive resin composition has a melt flow rate (MFR) [ASTM D 1238 (temperature: 190° C., 2160 g load)] of 0.1 to 3 g/10 min and a density of 920 to 930 kg/m$^3$, and has an elution of 60 wt % or less at 85° C. or lower as determined by cross-fractionation chromatography.

2. The adhesive resin composition according to claim 1, which further comprises 0 to 30 wt % of an unmodified ethylene polymer (A3) having a density of 930 to 980 kg/m$^3$ where (A1)+(A2)+(A3)=100 wt %.

3. The adhesive resin composition according to claim 1, wherein the graft amount of the unsaturated carboxylic acid or a derivative thereof is 0.001 to 10 wt %.

4. The adhesive resin composition according to claim 1, which has an Izod impact strength as measured in accordance with ASTM D 256 under −40° C. atmosphere of 10 kJ/m$^2$ or more.

5. A multilayer structure comprising an adhesive layer (A) formed from the adhesive resin composition according to claim 1, a polyethylene resin layer (B), and a polymer layer (C) selected from the group consisting of an ethylene•vinyl acetate copolymer saponification product and a polyamide.

6. The multilayer structure according to claim 5, wherein the ethylene.vinyl acetate copolymer saponification product is a polymer having a saponification degree of 90 to 100% which is obtained by saponifying an ethylene•vinyl acetate copolymer having an ethylene content percentage of 15 to 70 mol %.

7. The multilayer structure according to claim 5, wherein the polyamide is at least any of nylon 6, nylon 66, nylon 610, nylon 12, nylon 11, MXD nylon, an amorphous nylon and a copolymerized nylon.

8. The multilayer structure according to claim 5, which comprises a rigrind layer (D) between the layer (B) and the layer (A).

9. An automotive fuel tank comprising the multilayer structure according to claim 5.

10. A multilayer structure comprising an adhesive layer (A) formed from the adhesive resin composition according to claim 2, a polyethylene resin layer (B), and a polymer layer (C) selected from the group consisting of an ethylene•vinyl acetate copolymer saponification product and a polyamide.

11. A multilayer structure comprising an adhesive layer (A) formed from the adhesive resin composition according to claim 3, a polyethylene resin layer (B), and a polymer layer (C) selected from the group consisting of an ethylene•vinyl acetate copolymer saponification product and a polyamide.

12. A multilayer structure comprising an adhesive layer (A) formed from the adhesive resin composition according to claim 4, a polyethylene resin layer (B), and a polymer layer (C) selected from the group consisting of an ethylene•vinyl acetate copolymer saponification product and a polyamide.

13. An automotive fuel tank comprising the multilayer structure according to claim 6.

14. An automotive fuel tank comprising the multilayer structure according to claim 7.

15. An automotive fuel tank comprising the multilayer structure according to claim 8.

* * * * *